US012592535B2

(12) United States Patent
Gattass et al.

(10) Patent No.: US 12,592,535 B2
(45) Date of Patent: Mar. 31, 2026

(54) MULTI-WAVELENGTH SOURCES BASED ON PARAMETRIC AMPLIFICATION

(71) Applicant: The Government of the United States of America, as represented by the Secretary of the Navy, Arlington, VA (US)

(72) Inventors: Rafael R. Gattass, Washington, DC (US); L. Brandon Shaw, Woodbridge, VA (US); Daniel L. Rhonehouse, Huntingtown, MD (US); Jasbinder S. Sanghera, Ashburn, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 774 days.

(21) Appl. No.: 18/080,063

(22) Filed: Dec. 13, 2022

(65) Prior Publication Data

US 2023/0114053 A1      Apr. 13, 2023

Related U.S. Application Data

(63) Continuation-in-part of application No. 16/545,799, filed on Aug. 20, 2019, now Pat. No. 11,557,872.

(51) Int. Cl.
*H01S 3/067* (2006.01)
*G02B 6/02* (2006.01)
(Continued)

(52) U.S. Cl.
CPC .......... *H01S 3/06741* (2013.01); *G02F 1/395* (2013.01); *H01S 3/06716* (2013.01); (Continued)

(58) Field of Classification Search
None
See application file for complete search history.

(56) References Cited

U.S. PATENT DOCUMENTS

| | | | |
|---|---|---|---|
| 2006/0209908 A1* | 9/2006 | Pedersen ............... | H01S 3/1115 |
| | | | 372/6 |
| 2016/0028204 A1* | 1/2016 | Tu ........................ | H01S 3/0057 |
| | | | 385/27 |
| 2018/0217323 A1* | 8/2018 | Lyngsø~ e ............. | G02B 21/06 |

OTHER PUBLICATIONS

Hao et al. "Cascaded Four-Wave Mixing in Nonlinear Yb-Doped Fiber Amplifiers", IEEE Journal of Selected Topics in Quantum Electronics, vol. 20 no. 5, pp. 0900205, Sep./Oct. 2014 (Year: 2014).*

* cited by examiner

*Primary Examiner* — Eric L Bolda
(74) *Attorney, Agent, or Firm* — US Naval Research Laboratory; Suresh Koshy

(57) ABSTRACT

An apparatus includes a first photonic crystal fiber. The first photonic crystal fiber includes a first dispersion at a pump wavelength. The first photonic crystal fiber includes a zero dispersion. The pump wavelength is within 100 nm of the zero dispersion. The first dispersion is normal. The first photonic crystal fiber includes a first mode field diameter at the pump wavelength. The apparatus also includes a second photonic crystal fiber coupled to the first photonic crystal fiber and outputs a broadband spectrum. The second photonic crystal fiber includes a second dispersion at the pump wavelength. The second dispersion is anomalous. The second dispersion is negative, and the first dispersion is positive. The second photonic crystal fiber includes a second mode field diameter at the pump wavelength. The second mode field diameter is smaller than the first mode field diameter.

5 Claims, 9 Drawing Sheets

(51) Int. Cl.
    *G02F 1/39*         (2006.01)
    *H01S 3/094*      (2006.01)
    *H01S 3/108*      (2006.01)

(52) U.S. Cl.
    CPC .... *H01S 3/06758* (2013.01); *H01S 3/094007*
        (2013.01); *H01S 3/1083* (2013.01); *G02B*
      *6/02333* (2013.01); *G02B 6/02342* (2013.01);
                *G02B 6/02347* (2013.01)

FIG. 2B

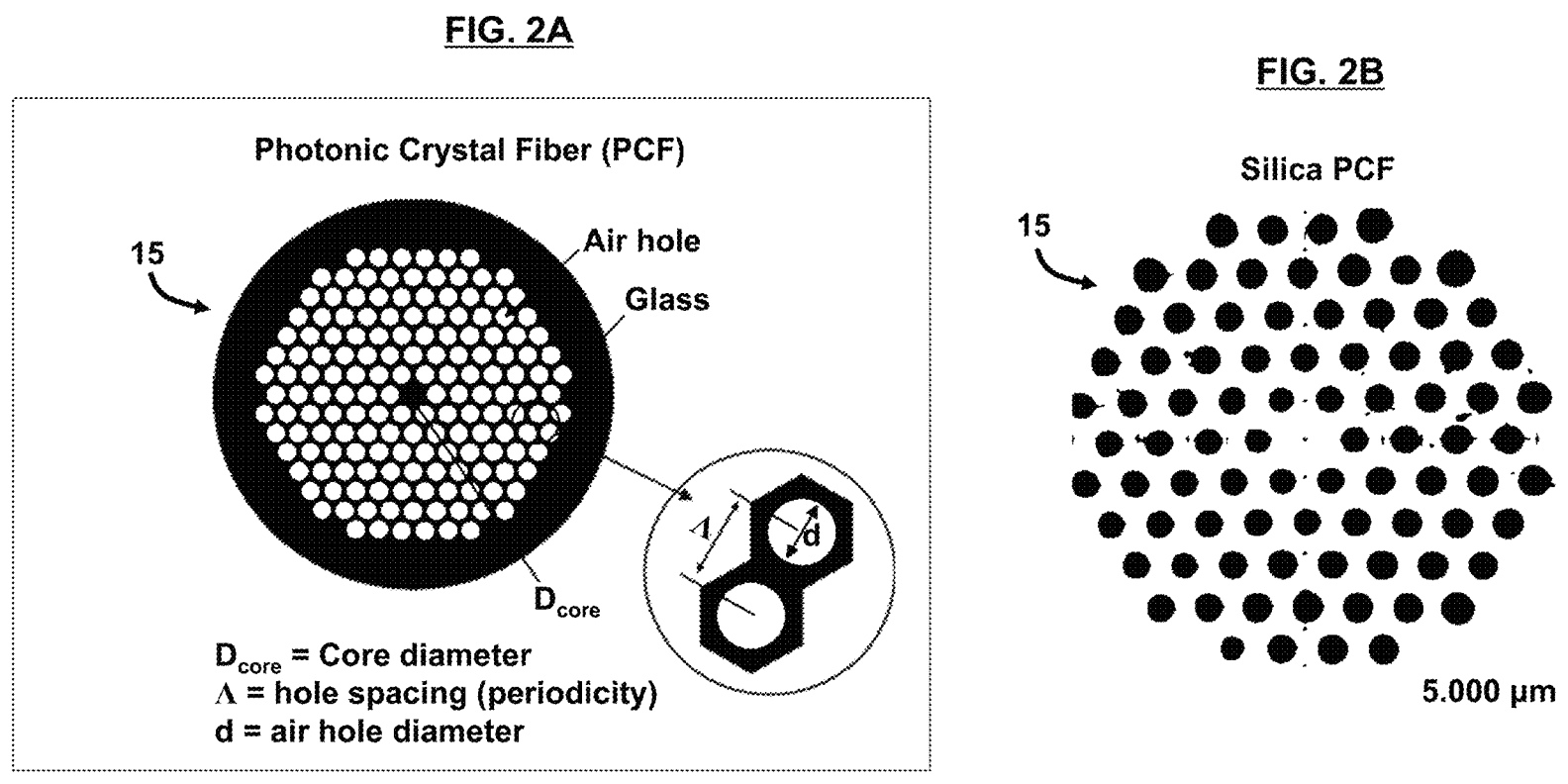

Silica PCF 5.000 μm

FIG. 2A

Photonic Crystal Fiber (PCF)

Air hole

Glass $D_{core}$ $D_{core}$ = Core diameter
$\Lambda$ = hole spacing (periodicity)
$d$ = air hole diameter

FIG. 3A

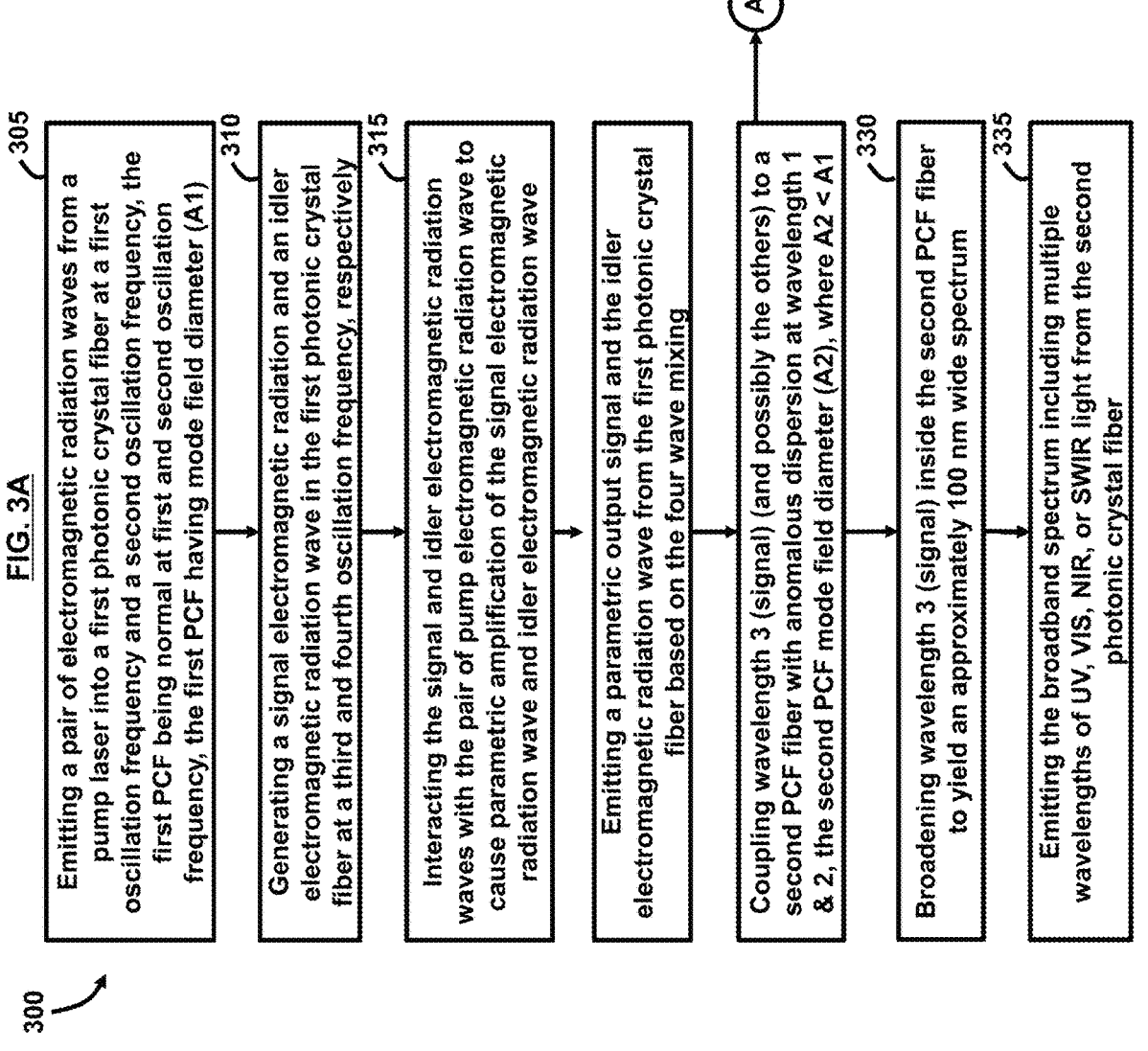

300

305
Emitting a pair of electromagnetic radiation waves from a pump laser into a first photonic crystal fiber at a first oscillation frequency and a second oscillation frequency, the first PCF being normal at first and second oscillation frequency, the first PCF having mode field diameter (A1)

310
Generating a signal electromagnetic radiation and an idler electromagnetic radiation wave in the first photonic crystal fiber at a third and fourth oscillation frequency, respectively 315
Interacting the signal and idler electromagnetic radiation waves with the pair of pump electromagnetic radiation wave to cause parametric amplification of the signal electromagnetic radiation wave and idler electromagnetic radiation wave Emitting a parametric output signal and the idler electromagnetic radiation wave from the first photonic crystal fiber based on the four wave mixing Coupling wavelength 3 (signal) (and possibly the others) to a second PCF fiber with anomalous dispersion at wavelength 1 & 2, the second PCF mode field diameter (A2), where A2 < A1

330
Broadening wavelength 3 (signal) inside the second PCF fiber to yield an approximately 100 nm wide spectrum 335
Emitting the broadband spectrum including multiple wavelengths of UV, VIS, NIR, or SWIR light from the second photonic crystal fiber

A

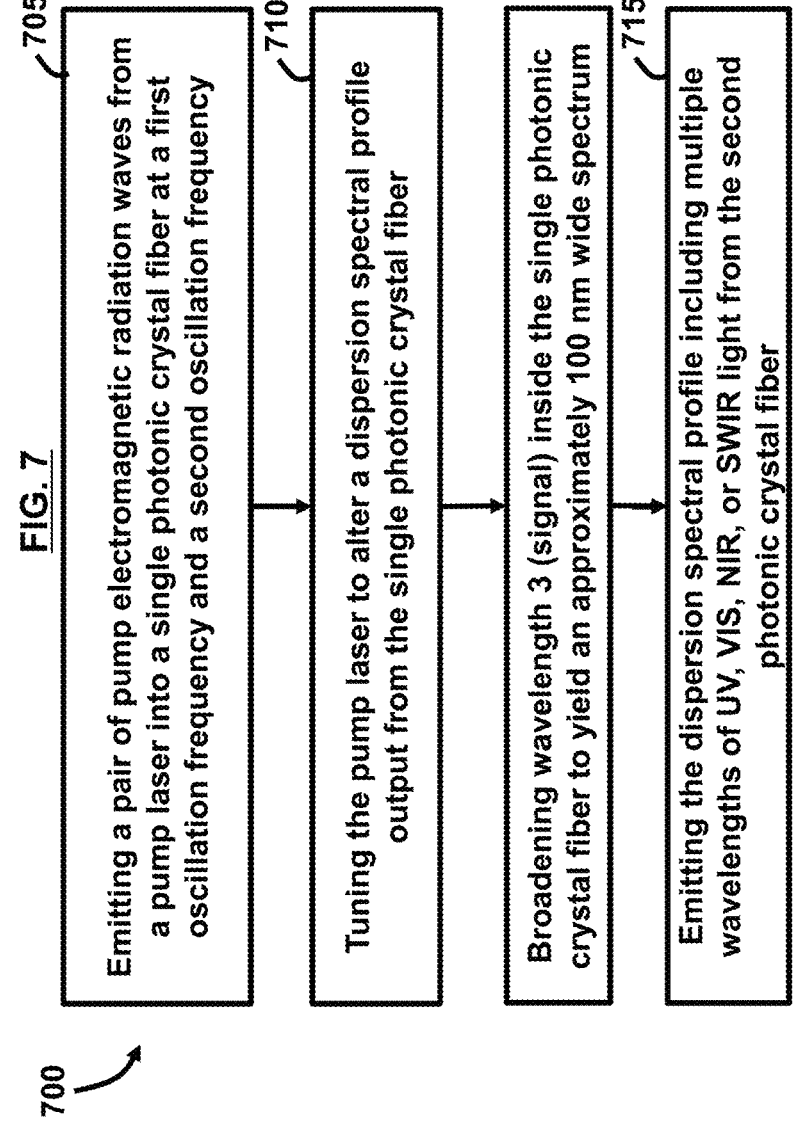

Emitting a pair of pump electromagnetic radiation waves from a pump laser into a single photonic crystal fiber at a first oscillation frequency and a second oscillation frequency

710

Tuning the pump laser to alter a dispersion spectral profile output from the single photonic crystal fiber

715

Broadening wavelength 3 (signal) inside the single photonic crystal fiber to yield an approximately 100 nm wide spectrum Emitting the dispersion spectral profile including multiple wavelengths of UV, VIS, NIR, or SWIR light from the second photonic crystal fiber

MULTI-WAVELENGTH SOURCES BASED ON PARAMETRIC AMPLIFICATION

CROSS REFERENCE TO RELATED APPLICATION

This continuation-in-part patent application claims benefit from U.S. patent application Ser. No. 16/545,799 filed on Aug. 19, 2019, which is herein incorporated by reference and which in turn claims the benefit of U.S. Provisional Patent Application No. 62/765,283 filed on Aug. 20, 2018, which is herein incorporated by reference.

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 109,181-US3.

BACKGROUND

Technical Field

The embodiments herein generally relate to optical communication systems, and more particularly to optical amplification systems for achieving high brightness visible to SWIR sources.

Description of the Related Art

Parametric amplification in a glass optical fiber is a third order nonlinear process dependent upon $\chi^{(3)}$ of the glass. Parametric amplification operates by the process of four-wave mixing, involving the interaction of four optical waves. In parametric amplification, one or two pump waves at frequency $\omega_1$ and $\omega_2$ amplifies a signal wave at frequency $\omega_3$ and generates an idler wave at frequency $\omega_4$. In the one pump, or degenerate, parametric processes, $\omega_1 = \omega_2$. The frequencies of the signal and idler waves are related to the frequencies of the pump waves by the relation $\omega_1 + \omega_2 = \omega_3 + \omega_4$. To achieve parametric amplification, phase matching between the pump, signal, and idler waves is required. The signal wave and/or idler wave to be amplified may be coupled into the fiber or parametrically generated spontaneously in the fiber through four-wave mixing. Phase matching can be achieved by careful control of the dispersion of the fiber.

For industry, materials processing, biological sensing, and laser display technology for next generation projection theater also require laser sources at wavelengths not available in current laser sources. Of particular interest for industry is generation of sources in the UV and blue which is of interest in materials processing of copper and gold and blue lasers for display technology. Similarly, available laser sources do not always access the wavelength and wavebands of interest and needed for some commercial or public-sector applications.

Some previous solutions for achieving high brightness infrared fiber parametric amplifiers and light sources are described in U.S. Pat. Nos. 9,570,873 and 9,577,401, the complete disclosures of which, in their entireties, are herein incorporated by reference. While the techniques described by these patents and others were sufficient for the purposes for which they were designed, there remains a need for a new technique to achieve high brightness, multi-wavelength sources over a broad wavelength region, particularly from the UV to SWIR wavelength regions.

SUMMARY OF THE INVENTION

An embodiment of the invention includes an apparatus. The apparatus includes a first photonic crystal fiber. The first photonic crystal fiber includes a first dispersion at a pump wavelength. The first dispersion is normal. The first photonic crystal fiber includes a first mode field diameter at the pump wavelength. The apparatus also includes a second photonic crystal fiber coupled to the first photonic crystal fiber and outputs a broadband spectrum. The second photonic crystal fiber includes a second dispersion at the pump wavelength. The second dispersion is anomalous. The second dispersion is smaller than the first dispersion. The second photonic crystal fiber includes a second mode field diameter at the pump wavelength. The second mode field diameter is smaller than the first mode field diameter.

Optionally, the apparatus further includes a pump laser, in operation, emitting an electromagnetic radiation wave comprising the pump wavelength. The apparatus further includes a coupler coupled to the pump laser and to the first photonic crystal fiber. Optionally, the pump laser comprises a Ytterbium (Yb) doped fiber laser with a linewidth<1 nm.

Optionally, the first photonic crystal fiber and/or the second photonic crystal fiber includes a silica, solid core photonic crystal fiber. The silica, solid core photonic crystal fiber includes a core diameter between 2 μm and 25 μm. Optionally, a signal laser is coupled to the first photonic crystal fiber. The signal laser, in operation, emits a signal wavelength. The signal wavelength is phase matched to the pump wavelength, thereby satisfying the four-wave mixing, phase matching condition of the first photonic crystal fiber.

Another embodiment of the invention includes a method including the following. A pair of pump electromagnetic radiation waves are emitted from a pump laser into a first photonic crystal fiber at a first oscillation frequency and a second oscillation frequency, respectively. The first photonic crystal fiber includes a normal dispersion at the first oscillation frequency and the second oscillation frequency. The first photonic crystal fiber includes a first mode field diameter. A parametric signal and the idler electromagnetic radiation wave are emitted from the first photonic crystal fiber based on four-wave mixing. A signal electromagnetic radiation wave and an idler electromagnetic radiation wave are generated in the first photonic crystal fiber at a third oscillation frequency and a fourth oscillation frequency, respectively. The pair of pump electromagnetic radiation waves, the signal electromagnetic radiation wave, and the idler electromagnetic radiation wave being phase matched, the signal electromagnetic radiation wave and the idler electromagnetic radiation wave interact with the pair of pump electromagnetic radiation waves to cause parametric amplification of the signal electromagnetic radiation wave and the idler electromagnetic radiation wave. At least the parametric signal is coupled to a second photonic crystal fiber. The second photonic crystal fiber includes an anomalous dispersion at the first oscillation frequency and the second oscillation frequency. The second photonic crystal fiber includes a second mode field diameter. The second mode field diameter is smaller than the first mode field diameter.

Optionally, the method includes the following. The parametric signal is spectrally broadened inside the second photonic crystal fiber to yield a broadband spectrum. The broadband spectrum includes multiple wavelengths of UV, VIS, NIR, or SWIR light. The pump laser is tuned to alter the broadband spectrum. The broadband spectrum is emitted from the second photonic crystal fiber.

Another embodiment of the invention includes an apparatus. The apparatus includes a single photonic crystal fiber, which includes a first end, a propagation length, and a second end. The single photonic crystal fiber includes a varying dispersion that varies along the propagation length. The single photonic crystal fiber includes a varying mode field diameter that varies along the propagation length. The first end includes a first dispersion at a wavelength. The first dispersion is normal. The second end includes a second dispersion at the wavelength. The second dispersion is anomalous. The first end includes a first mode field diameter at the wavelength. The second end includes a second mode field diameter at the wavelength. The second mode field diameter is smaller than the first mode field diameter.

Optionally, the apparatus further includes a pump laser, in operation, emitting an electromagnetic radiation wave comprising the wavelength. The apparatus further includes a coupler coupled to the pump laser and to the single photonic crystal fiber. Optionally, the pump laser comprises a Ytterbium (Yb) doped fiber laser with a linewidth<1 nm.

Optionally, the first photonic crystal fiber and/or the second photonic crystal fiber includes a silica, solid core photonic crystal fiber. The silica, solid core photonic crystal fiber includes a core diameter between 2 μm and 25 μm. Optionally, the system 500 further includes a signal laser 45 coupled to the first photonic crystal fiber 15, such as shown by way of illustration in FIG. 5. The signal laser 45, in operation, emitting a signal wavelength 150.

Another embodiment of the invention includes a method, which includes the following. A pair of pump electromagnetic radiation waves is emitted from a pump laser into a single photonic crystal fiber at a first oscillation frequency and a second oscillation frequency. The single photonic crystal fiber includes a first end, a propagation length, and a second end. The single photonic crystal fiber includes a varying dispersion that varies along the propagation length. The single photonic crystal fiber includes a varying mode field diameter that varies along the propagation length. The first end includes a first dispersion at the first oscillation frequency and second oscillation frequency. The first dispersion is normal. The second end includes a second dispersion at the first oscillation frequency and second oscillation frequency. The second dispersion is anomalous. The first end includes a first mode field diameter at the first oscillation frequency and second oscillation frequency. The second end includes a second mode field diameter at the wavelength. The second mode field diameter is smaller than the first mode field diameter. The pump laser is tuned to alter a broadband spectrum. The broadband spectrum is emitted from the second end.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications. Further, the terms "a", "an", "first", "second", and "third" etc. used herein do not denote limitations of quantity, but rather denote the presence of one or more of the referenced items(s).

BRIEF DESCRIPTION OF THE DRAWINGS

The embodiments herein will be better understood from the following detailed description with reference to the drawings, in which:

FIG. 2A is a schematic diagram illustrating an illustrative photonic crystal fiber used in the system of FIG. 1, according to an embodiment of the instant invention;

FIG. 2B is a schematic diagram illustrating an illustrative silica photonic crystal fiber used in the system of FIG. 1, according to an embodiment of the instant invention;

FIG. 3A is a flow diagram illustrating a method for amplifying an intensity of an optical signal, according to an embodiment of the invention;

FIG. 7 is a flow diagram illustrating a method for amplifying an intensity of an optical signal, according to another embodiment of the invention;

DETAILED DESCRIPTION OF THE INVENTION

Figure 1:
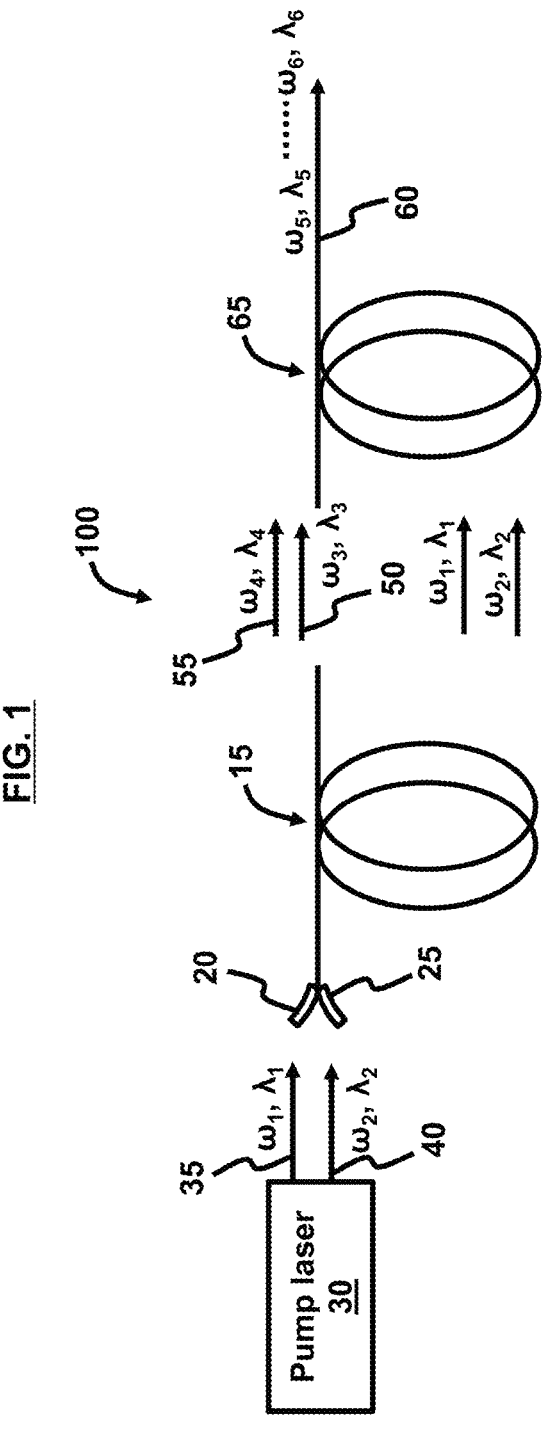
FIG. 1 is a block diagram illustrating a system of parametric generation, amplification, and broadening, according to an embodiment of the invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

An embodiment herein provides a system and method for achieving high brightness, multi-wavelength (two or greater simultaneous) sources over a broad wavelength region, from UV to Short Wave-IR (e.g., ~200 nm to ~2000 nm), using the processes of parametric amplification followed by self-phase modulation and Raman generation and amplification. The embodiments herein can enable compact broadband lasers with spectral coverage over the UV to SWIR wavelength regions. FIGS. 1-8, wherein similar reference characters denote corresponding features consistently throughout the figures, show exemplary embodiments of the instant invention.

High brightness sources are understood to be sources with high radiance, which is defined as the total power in the beam divided by the mode area of the beam at the beam waist and the solid angle of the divergence of the beam with typical units of $W \cdot sr^{-1} \cdot m^{-2}$. High brightness sources also have low $M^2$ numbers where $M^2$ is defined as a relationship between the half-angle beam divergence $\theta$ and the $w_0$ is the beam radius at the minimum point (beam waist) for a given wavelength $\lambda$ such that:

$$\theta = M^2 \frac{\lambda}{\pi w_0}$$

For the purpose of this patent application, "high brightness" is a term of art and is defined herein as power levels that are on the order of 1 W or higher with $M^2 < 10$ (e.g., $M^2 < 2$). Conventional solutions for the generation of light in the wavelength range of interest generally fail to provide a way to generate high brightness light across the entire range with power levels on the order of 1 W. While certain wavelengths can be generated with high beam quality and Watt power levels, embodiments of the invention provide a way to generate a broad set of wavelengths across this wavelength range from a single original laser source, all with power levels exceeding 1 W.

The speed of light propagating inside a material is dependent on the wavelength of the light. This property is commonly referred to as chromatic dispersion. It is determined by the variation of the propagation constant with respect to the wavelength and contains contributions from the material dispersion (or materials in the case of multiple materials being used in the optical fiber) as well as the geometrical arrangement of the materials. The most commonly referred metric for dispersion is the second order derivative of the propagation constant ($\beta$):

$$\beta_2 = \frac{1}{c}\left(n\frac{dn}{d\omega} + \omega\frac{d^2n}{d\omega^2}\right)$$

Where c is the speed of light in vacuum, n is the refractive index and $\omega$ is the light frequency.

In fiber optics, the most common reference to chromatic dispersion comes from the dispersion parameter D defined as $$D(\lambda) = -\frac{2\pi c}{\lambda}\beta_2$$

Figure 8:
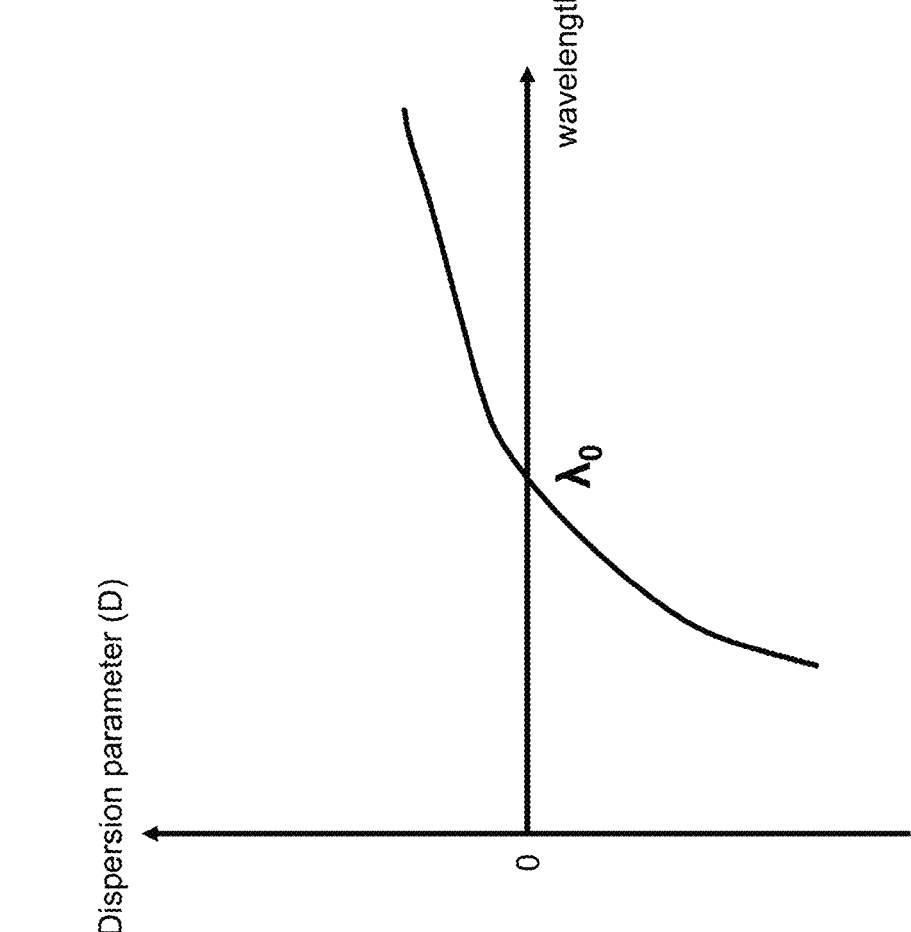
FIG. 8 is an illustrative graphical representation of dispersion showing an illustrative zero dispersion wavelength.

When light propagates in a fiber where the dispersion parameter is larger than zero, the light is said to be propagating in the normal dispersion regime. When the light propagates in fiber with a dispersion parameter that is smaller than zero, the fiber is said to be propagating in the anomalous regime. The transition point where the dispersion is zero is called the zero dispersion wavelength, $\lambda_0$, such as shown in FIG. 8.

Another characteristic of a photonic crystal fiber according to an embodiment of the invention is the mode field area. This characteristic defines the effective area of the optical mode propagating inside the photonic crystal fiber. It is commonly calculated as $$A_{eff} = \frac{\left(\int I\, dA\right)^2}{\int I^2\, dA}$$

where I is the optical mode field intensity, and A is the cross section area of the optical fiber. From this effective area ($A_{eff}$), one can define a mode field radius (r) by $A_{eff} = \pi r^2$.

FIG. 1 illustrates a system 100 of parametric generation and amplification. The system 100 includes a first photonic crystal fiber 15. The first photonic crystal fiber 15 includes a first dispersion at a pump wavelength. The first photonic crystal fiber 15 includes a zero dispersion wavelength. The pump wavelength is within 100 nm of the zero dispersion wavelength. A photonic crystal fiber with normal dispersion at such a pump wavelength supports four-wave mixing. One of ordinary skill in the art will readily appreciate that if the pump wavelength is too far from the zero dispersion, four-wave mixing will not be the dominant effect. The first dispersion is normal. The first photonic crystal fiber 15 includes a first mode field diameter at the pump wavelength. The system 100 also includes a second photonic crystal fiber 65 coupled to the first photonic crystal fiber 15 and outputs a broadband spectrum. The broadband spectrum, represented in FIG. 1 as "$\omega_5, \lambda_5 \ldots \omega_6, \lambda_6$", includes a spectral range of optionally varying spectral power distribution from an oscillation frequency $\omega_5$ and wavelength $\lambda_5$ to an oscillation frequency $\omega_6$ and wavelength $\lambda_6$. The second photonic crystal fiber 65 includes a second dispersion at the pump wavelength. The second dispersion is anomalous. The second dispersion is negative, and the first dispersion is positive. The second photonic crystal fiber 65 includes a second mode field diameter at the pump wavelength. The second mode field diameter is smaller than the first mode field diameter. For example, typical reductions of the mode field diameter from the first mode field diameter to the second mode field diameter are, for example, in the range of 1.2 to 10, and more typically in the range of 1.2 to 2.5.

Optionally, the system 100 further includes a standard pump laser 30 coupled directly or indirectly to the first photonic crystal fiber 15. In operation, the pump laser 30 emits the pump wavelength 35. The pump laser 30, for example, includes a standard semiconductor laser light source or a standard fiber laser. One of ordinary skill in the art will readily appreciate that tour-wave mixing requires two electromagnetic radiation waves from the pump laser 30. In an embodiment of the invention, the two electromagnetic radiation waves emitted by the pump laser 30 have the same pump wavelength. In another embodiment of the invention, the two electromagnetic radiation waves emitted by the pump laser 30 have different respective pump wavelengths. The system 100 further includes a first coupler 20 and a second coupler 25 coupled to the pump laser 30 and to the first photonic crystal fiber 15. Optionally, the pump laser 30 comprises a standard Ytterbium (Yb) doped fiber laser with a linewidth<1 nm. The gain generated through four-wave mixing parametric generation and amplification is directly dependent on the phase matching of the waves. The pump waves ($\omega_1$ and $\omega_2$) as well as the signal ($\omega_3$) and idler ($\omega_4$) need to be phase matched inside the photonic crystal fiber to allow for accumulation of gain. Any mismatch in the phase matching will limit gain build up to a certain fiber length, $L_{eff}$, typically referred to as effective length. The broader the bandwidth of the pump laser, the harder it is to find a phase matching curve that is satisfied for realistic fiber lengths (0.5-100 m, more typically 1 to 10 m). To enhance conversion, the pump laser's power must be increased, which increases the complexity of the system needed. In an embodiment of the invention, laser systems with linewidths<1 nm, and above 0.1 nm provide a sweet spot for frequency conversion, where dispersion and phase matching can be accomplished in realistic lengths with peak powers<100 kW (e.g., more typically <10 kW) while still avoiding Brillouin effects that are detrimental to the laser. Optionally, the first photonic crystal fiber 15 and/or the second photonic crystal fiber 65 includes a standard silica, solid core photonic crystal fiber. The silica, solid core photonic crystal fiber, for example, includes a core diameter between 2 μm and 25 μm. For example, the first photonic crystal fiber ("PCF") 15 is an optical fiber whose guiding solid core region is surrounded by air holes. The air holes create a reduced index cladding which contains light in the solid core region. An advantage of first photonic crystal fiber 15 over a conventional core/clad fiber is that the dispersion of the fiber can be more easily tailored by manipulating cladding microstructured hole size and periodicity as well as core size. In addition, very small core sizes are possible, resulting in increased nonlinearities in the first photonic crystal fiber 15. An illustrative schematic of a first photonic crystal fiber 15 is shown in FIGS. 2A-2B. Example methods of tuning the first photonic crystal fiber 15 include the following. For instance, during fabrication of the first photonic crystal fiber 15, controlling, the size of a (solid glass) core, controlling the size of the cladding such as silica glass illustrated in FIGS. 2A-2B and/or the silica rods, controlling a geometrical arrangement, and controlling the hole size to pitch ratio of the first photonic crystal fiber 15, having a pitch, which is radially varying. Alternatively, during operation of the first photonic crystal fiber 15 with pump laser waves, changing the wavelength of a pump laser wave changes the broadband spectrum. Furthermore, maximization of nonlinear conversion of the first photonic crystal fiber 15, and efficient parametric conversion with low peak power pulses or continuous wave laser sources, and minimization of power penalties are obtained, by the design of the first photonic crystal fiber 15 and the choice of pump waves, for example.

As shown by way of example in FIGS. 2A-2B, the first photonic crystal fiber 15 includes a solid glass core, such as that formed by a plurality of glass rods surrounded by a plurality of air holes, where the solid glass and/or core has a distance Lambda ($\Lambda$) forming the pitch between each air hole in the plurality of air holes, and where each air hole, in the plurality of air holes, has a hole size d. Thus, in exemplary embodiments, at least one glass rod of the plurality of glass rods can be a core and/or core rod of the first photonic crystal fiber 15 used in accordance with the embodiments herein.

In an exemplary embodiment, one of the ways the first photonic crystal fiber 15 is tuned, during fabrication, includes controlling, the size of the solid glass core and/or core rod, and/or controlling the size of the cladding (such as the glass and/or the glass rods), by determining the geometrical arrangement of the hole (where such a geometrical arrangement can be a hexagonal configuration; i.e., a hex pack hole arrangement, and/or tuning can be accomplished by controlling the hole size to pitch ratio of the first photonic crystal fiber 15, having the pitch which is radially varying, where the hole size divided by the distance forms the ratio of hole size to pitch.

In exemplary embodiments, other geometrical arrangements of holes are configured which are not based on a hex pack hole arrangement. Thus, in exemplary embodiments holes can be geometrically arranged in configurations of rings of holes as well as and/or hex pack hole arrangements and any combination of these and/or other geometrical arrangements of holes and hole size. In exemplary embodiments, other core/cladding compositions can be used extending beyond just the use of the first photonic crystal fiber 15. Thus, in exemplary embodiments, some configurations include solid core/cladding used with specific fiber designs. In the first exemplary embodiment, the first photonic crystal fiber 15 is formed by drawing glass rods and/or core rod and/or tubes through a fiber preform. Additionally, in the first exemplary embodiment, electromagnetic radiation waves can be launched into the first photonic crystal fiber 15, as further described below, and additional tuning operations of one or more wavelengths of the one or more electromagnetic radiation waves can be performed in the first photonic crystal fiber 15 to obtain and/or accomplish fiber optic amplification in a spectrum of infrared electromagnetic radiation.

Again with reference to FIG. 1, the system 10 comprises a standard pump laser 30 coupled to the first coupler 20, wherein the pump laser 30 emits a first electromagnetic radiation wave 35 (i.e., an optical pump signal) into the first photonic crystal fiber 15 at a first oscillation frequency $\omega_1$ and a second electromagnetic radiation wave 40 (i.e., an optical pump signal) into the first photonic crystal fiber 15 at a second oscillation frequency $\omega_2$, and wherein the first oscillation frequency $\omega_1$ equals the second oscillation frequency $\omega_2$. Optionally, the first electromagnetic radiation wave 35 is identical to the second electromagnetic radiation wave 40, if the pump laser 30 emits electromagnetic radiation waves at a single wavelength. The pump laser 30, for example, includes a standard semiconductor laser light source or a standard fiber laser. The pump laser 30 is communicatively coupled to either the solid glass or core rod in the first photonic crystal fiber 15 through the first coupler 20 and the second coupler 25. In an example, the pump laser comprises a Ytterbium (Yb) doped fiber laser with a linewidth<1 nm.

The first electromagnetic radiation wave 35 and the second electromagnetic radiation wave 40 interact in the first photonic crystal fiber 15 to generate a third electromagnetic radiation wave (or parametric signal) 50 and a fourth electromagnetic radiation (or idler) wave 55 through four-wave mixing whereby the first electromagnetic wave and second electromagnetic wave amplify the third electromagnetic wave and fourth electromagnetic wave by parametric amplification (e.g., due to nonlinearities in the transmission medium).

The first wavelength $\lambda_1$ and the second wavelength $\lambda_2$ propagate in the first photonic crystal fiber 15 with normal dispersion, and a broadband spectrum that causes a first wavelength $\lambda_1$ of the first electromagnetic radiation wave 35, a second wavelength $\lambda_2$ of the second electromagnetic radiation wave 40, a third wavelength $\lambda_3$ of the third electromagnetic radiation wave 50, and a fourth wavelength $\lambda_4$ of the fourth electromagnetic radiation wave 55 to all be phase matched. The first photonic crystal fiber 15 has a dispersion profile and the dispersion profile causes a first wavelength $\lambda_1$ of the first electromagnetic radiation wave 35 and a second wavelength $\lambda_2$ of the second electromagnetic radiation wave 40, a third wavelength $\lambda_3$ of the third electromagnetic radiation wave 50, and the fourth wavelength $\lambda_4$ of the fourth electromagnetic radiation wave 55 to be phase matched (i.e., which is characterized by $k_3+k_4-k_1-k_2\sim0$.

Parametric generation and amplification is achieved by four-wave mixing. The first photonic crystal fiber 15 emits an idler 55 based on the four-wave mixing, and the parametric signal 50. The system 10 further includes a second photonic crystal fiber 65 to convert the parametric signal 50 through self-phase modulation and Raman conversion. The new frequency generated output includes a broad range of oscillation frequencies $\omega_5$ to $\omega_6$ that span, for example, at least 100 nm band width in the visible range. The second photonic crystal fiber 65, for example, has a different broadband spectrum and mode field diameters than first photonic crystal fiber 15. At the first wavelength $\lambda_1$, i.e., the pump wavelength, the mode field diameter of the second photonic crystal 65 is smaller than the mode field diameter of photonic crystal fiber 15. At the first wavelength $\lambda_1$, i.e., the pump wavelength, the dispersion of the second photonic crystal fiber 65 is anomalous in contrast to the dispersion of first photonic crystal fiber 15 which is normal. The dispersion of the second photonic crystal fiber 65 is negative, and the dispersion of the first photonic crystal fiber 15 is positive.

Four-wave mixing is used in telecom typically to amplify near and around a certain pump wavelength; that is the signal and idler are typically within 100 nm of the pump wavelength. In the embodiments herein, four-wave mixing sources are provided where the signal and/or idler can be >100 nm from the pump wavelength. The generation of high power (defined as 1 W or greater) conversion of light through four-wave mixing in the first optical first photonic crystal fiber 15 requires controlling multiple non-linear processes that compete, such as Raman and self-phase modulation. Efficient conversion through four-wave mixing requires that the multiple generated waves propagate at the same speed inside the first photonic crystal fiber 15 and have a large spatial overlap between modes, where large spatial overlap is understood to be above 50%. Both of these conditions are satisfied in the first photonic crystal fiber 15. The use of the first photonic crystal fiber 15 allows for the zero dispersion point to be moved away from the value imposed by the fiber material. To achieve wavelengths not accessible by parametric amplification in the first photonic crystal fiber 15, the remaining unconverted first wavelength $\lambda_1$ of the first electromagnetic radiation wave 35 and the remaining second wavelength $\lambda_2$ of the second electromagnetic radiation wave 40, the third wavelength $\lambda_3$ of the third electromagnetic radiation wave 50, and the fourth wavelength $\lambda_4$ of the fourth electromagnetic radiation wave 55 interact inside second photonic crystal fiber 65 through a self-phase modulation and a Raman generation and amplification to achieve a broad set of wavelengths below the parametric wavelengths.

One or more of the embodiments of the invention address common failures in generating high power light, where instead of using long lengths of fiber (e.g., 20 m or more) to increase the four-wave mixing efficiency, the system 10 utilizes high peak power (e.g., 1 kW to 1 MW) or high average power (e.g., 1 W to 5 kW) to convert the light in a short first photonic crystal fiber 15 (e.g., 0.1 to 20 m). By controlling the length of the first photonic crystal fiber 15 and the fiber configuration (i.e., dispersion of the fiber and mode overlaps), the use of a high peak power laser propagating does not broaden into a supercontinuum but instead, converts the power from the pump into the signal and idler waves. The threshold for four-wave mixing can be reduced below the threshold for Raman conversion in the first photonic crystal fiber, ensuring only the relevant as-designed idler and signal wavelengths can be generated. Example pump wavelengths are within the range of 0.9 to 1.2 μm, and more specifically in the range of 1.02 to 1.16 μm. An embodiment of the invention includes a standard polarized pump laser and a standard polarization-maintaining ("PM") first photonic crystal fiber 15. Other embodiments of the invention include a standard unpolarized laser and/or a standard non-polarization-maintaining fiber.

According to the system 10, parametric sources include a silica first photonic crystal fiber 15 pumped by laser 30 at oscillation frequency $\omega_1$ and oscillation frequency $\omega_2$ (where $\omega_1=\omega_2$). Pump wavelengths from the pump laser 30 are launched into the core of the first photonic crystal fiber 15 at an input end of the first photonic crystal fiber 15 by a coupling mechanism; e.g., first coupler 20. A parametric signal wave 50 at frequency $\omega_3$ and idler wave 55 at frequency $\omega_4$ is spontaneously generated in the core of the first photonic crystal fiber 15 by four-wave mixing and these waves are then amplified by the pump as they transmit through the first photonic crystal fiber 15. The pump(s), signal, and idler are transmitted in the first photonic crystal fiber 15 and interact. The pumps amplify the parametric signal wave 50 at frequency $\omega_3$ and idler wave 55 at frequency $\omega_4$. The dispersion of the first photonic crystal fiber 15 is configured so that the pump signal wave and idler wave 55 are phase matched; that is $k_3+k_4-k_1-k_2\sim0$.

The frequency broadened parametric seeded signal with spectrum between $\omega_5$ to $\omega_6$ may span from an ultraviolet ("UV") spectral region to visible range, in an example. The broadened parametric seeded signal may span from visible ("VIS") spectral region to a near-infrared ("NIR") in another example. The broadened parametric seeded signal may span from visible ("VIS") spectral region to a short-wave-infrared ("SWIR") spectral region, according to an example. For example, in an embodiment of the invention, a magnitude of the broadened spectrum with respect to the pump is 20 dB below peak.

Another embodiment of the invention includes a method 300, shown by way of illustration in FIGS. 3A-3B and FIGS. 4A-4B. In Step 305, a pump wavelength (and, in practice, a pair of pump wavelengths) are emitted from a pump laser into a first photonic crystal fiber at a first oscillation frequency and a second oscillation frequency. The first photonic crystal fiber includes a normal dispersion at the first oscillation frequency and the second oscillation frequency. The normal dispersion is positive. The first photonic crystal fiber includes a first mode field diameter. A parametric signal and the idler electromagnetic radiation wave are emitted from the first photonic crystal fiber based on four-wave mixing. In Step 310, a signal electromagnetic radiation wave and an idler electromagnetic radiation wave are generated in the first photonic crystal fiber at a third oscillation frequency and a fourth oscillation frequency, respectively. In Step 315, the signal electromagnetic radiation wave and the idler electromagnetic radiation wave interact with the pair of pump electromagnetic radiation waves to cause parametric amplification of the signal electromagnetic radiation wave and the idler electromagnetic radiation wave. In Step 320, at least the parametric signal is coupled to a second photonic crystal fiber. The second photonic crystal fiber includes an anomalous dispersion at the first oscillation frequency and the second oscillation frequency. The anomalous dispersion is negative. The second photonic crystal fiber includes a second mode field diameter. The second mode field diameter is smaller than the first mode field diameter.

Figure 3B:
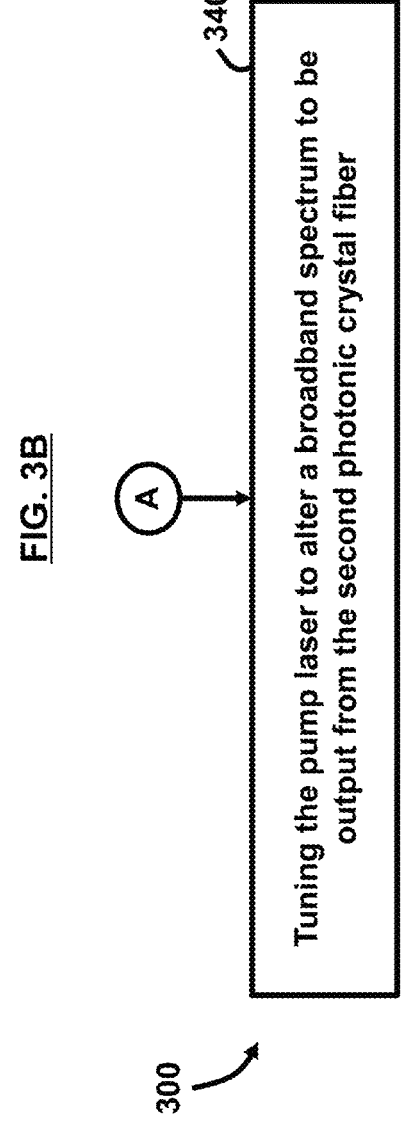
FIG. 3B is an optional step of the flow diagram of FIG. 3A, according to an embodiment of the invention.
Figures 4A, 4B:
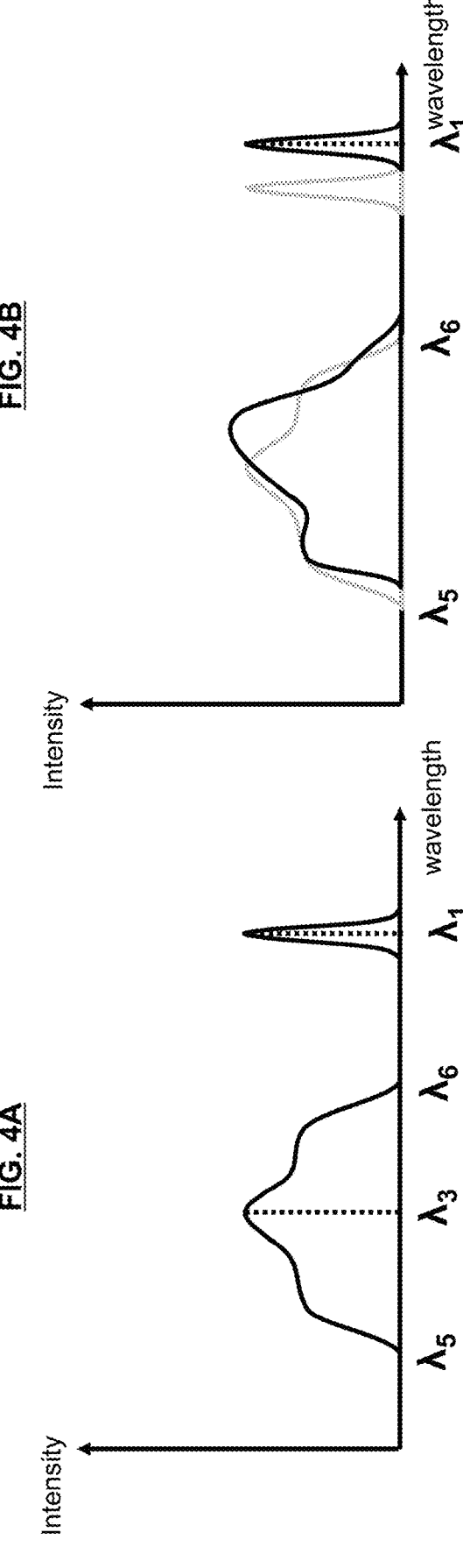
FIG. 4A is an illustrative graphical representation of a broadband spectrum output from a photonic crystal fiber as well as a pump laser wavelength according to an embodiment of the instant invention, the black-lined broadband spectrum representing an illustrative untuned broadband spectrum and the black-lined pump laser wavelength representing an illustrative untuned pump laser wavelength.
FIG. 4B is an illustrative graphical representation of a broadband spectrum output from a photonic crystal fiber according to an embodiment of the instant invention, the gray-lined broadband spectrum representing the illustrative untuned broadband spectrum, the gray-lined pump laser wavelength representing the illustrative untuned pump laser wavelength, the black-lined broadband spectrum representing an illustrative tuned broadband spectrum, and the black-lined pump laser wavelength representing an illustrative tuned, or adjusted, pump laser wavelength.

Optionally, as shown by way of illustration in FIG. 3B, the method 300 further includes the following. In Step 330, the parametric signal is broadened inside the second photonic crystal fiber to yield a broadband spectrum, such as shown in FIG. 4A. The black-lined broadband spectrum in FIG. 4A represents an illustrative untuned broadband spectrum. The broadband spectrum includes multiple wavelengths of LTV, VIS, NIR, and/or SWIR light. In Step 340, the pump laser is optionally tuned to alter a spectral power distribution of the broadband spectrum and/or to shift a wavelength range of the broadband spectrum, such as shown in FIG. 4B. The gray-lined broadband spectrum in FIG. 4B represents the illustrative untuned broadband spectrum, and the black-lined broadband spectrum represents an illustrative tuned broadband spectrum. In Step 335, the broadband spectrum is emitted from the second photonic crystal fiber.

Figure 5:
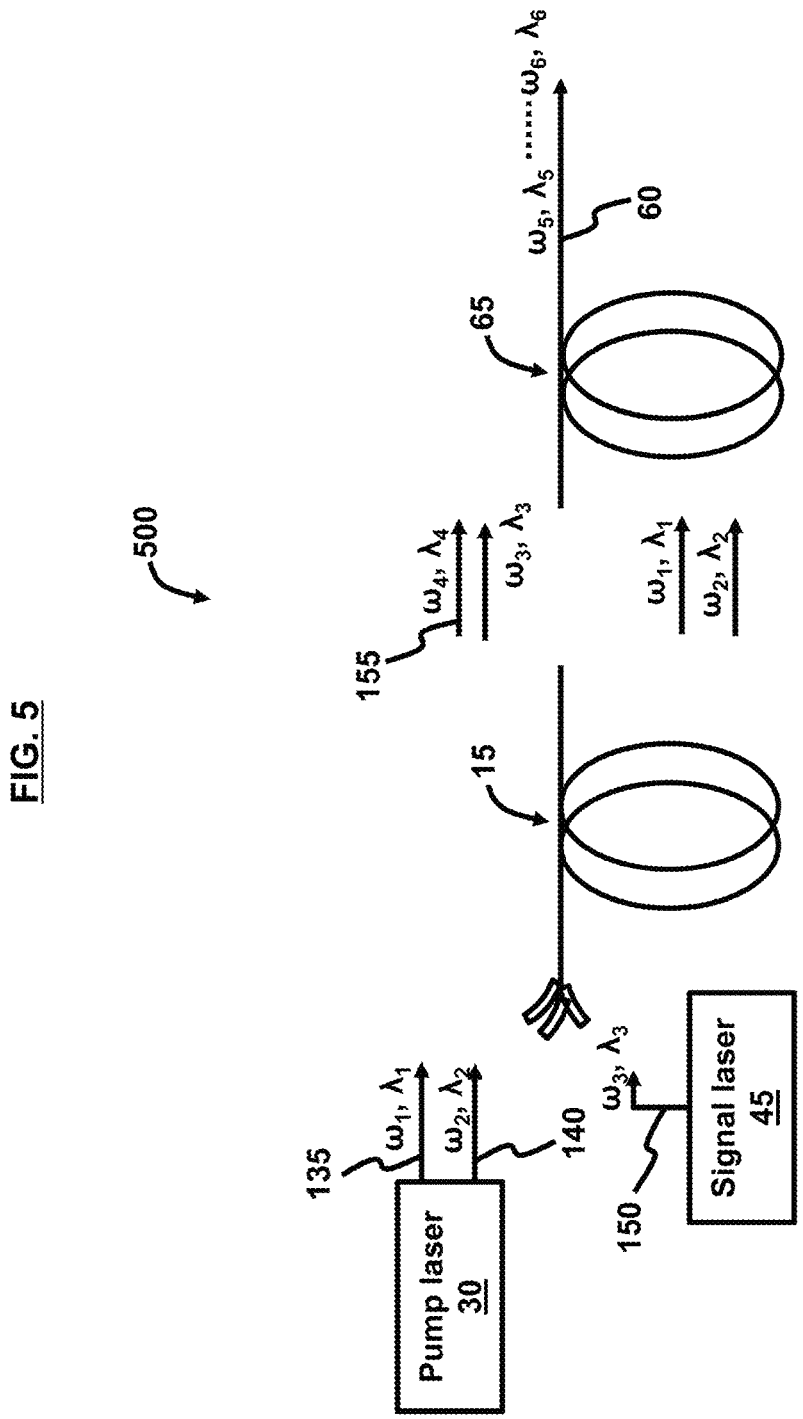
FIG. 5 is a block diagram illustrating a system of parametric amplification, according to another embodiment of the invention.

Another embodiment of the invention includes a system 500 of parametric amplification that is shown by way of illustration in FIG. 5. The system 500 comprises a first photonic crystal fiber 15; a pump laser 30 to emit (i.e., pump) a pump wavelength (and in practice a pair of pump wavelengths 135, 140) as an optical pump signal into the first photonic crystal fiber 15 at a first oscillation frequency $\omega_1$ and a second oscillation frequency $\omega_2$, respectively. Optionally, the apparatus further includes a standard signal laser 45 coupled to the first photonic crystal fiber 15. The signal laser, in operation, emits a signal wavelength 150, indicated in FIG. 5 as having oscillation frequency $\omega_3$ and wavelength $\lambda_3$.

For example, the first oscillation frequency $\omega_1$ equals the second oscillation frequency $\omega_2$. A signal wavelength 150 at a third oscillation frequency on and idler electromagnetic wavelength 155 are generated in the first photonic crystal fiber 15, wherein the signal wavelength 150 and idler wavelength 155 interacts with the pair of pump wavelengths 135, 140 to cause parametric amplification of the signal wavelength 150 and idler wavelength 155. In an embodiment of the invention, a signal laser 45 emits a signal wavelength 150 into the first photonic crystal fiber 15 at the third oscillation frequency $\omega_3$. The spectral linewidth of the signal laser is, for example, <1 nm.

Wave dispersion in the first photonic crystal fiber 15 causes phase matching of the pair of pump wavelengths 135, 140, the signal wavelength 150, and the idler wavelength 155. Parametric amplification is achieved by four-wave mixing. The first photonic crystal fiber 15 emits a parametric signal 50 based on the four-wave mixing. The system 500 further comprises a second photonic crystal fiber 65 to convert the parametric signal 150 through self-phase modulation and Raman conversion. The new frequency generated output comprises a broad range of oscillation frequencies $\omega_5$ to $\omega_6$ that span, for example, at least 100 nm band width in the visible range. The second photonic crystal fiber 65, for example, has a different broadband spectrum and mode field diameters than first photonic crystal fiber 15. At the first wavelength $\lambda_1$, the mode field diameter of second photonic crystal 65 is smaller than the mode field diameter of photonic crystal 15. At the first wavelength $\lambda_1$, the dispersion of photonic crystal 65 is anomalous in contrast to the dispersion of photonic crystal 15 which is normal.

Another embodiment of the invention includes a method for amplifying an intensity of an optical signal, for example, using the system 500 is described as follows. A pair of electromagnetic radiation waves 135, 140 is emitted from a pump laser 30 into a first photonic crystal fiber 15 at a first oscillation frequency $\omega_1$ and a second oscillation frequency $\omega_2$. The first oscillation frequency cot equals the second oscillation frequency $\omega_2$; the dispersion of the first photonic crystal fiber 15 is normal at first and second oscillation frequency, the first PCF having mode field diameter (A1). A signal wavelength 150 and an idler wavelength 155 are generated in the first photonic crystal fiber 15 at a third $\omega_3$ and fourth $\omega_4$ oscillation frequency, respectively. The signal wavelength 150 and idler wavelength 155 interact with the pair of pump wavelengths 135, 140 to cause parametric amplification of the signal wavelength 150 and idler wavelength 155, wherein wave dispersion in the first photonic crystal fiber 15 causes phase matching of the pair of pump wavelengths 135, 140, the signal wavelength 150, and the idler wavelength 155, and wherein the dispersion in first photonic crystal fiber 15 is normal for the pair of pump wavelengths 135, 140 and wherein parametric amplification is achieved by four-wave mixing. A parametric signal (e.g., wavelength 150) and idler (e.g., wavelength 155) are emitted from the first photonic crystal fiber 15 based on the four-wave mixing. Wavelength 3 (signal) (and optionally the other wavelengths) is coupled to a second photonic crystal fiber 65 with anomalous dispersion at wavelength 1 & 2, the second photonic crystal fiber having mode field diameter (A2), and where A2<A1. Wavelength 3 (i.e., signal) inside the second PCF fiber is broadened to yield a broadband spectrum 60 (e.g., 100 nm wide spectrum) including a broad range of new wavelengths in an ultraviolet ("UV"), visible ("VIS"), near-infrared ("NIR"), or short-wave-infrared ("SWIR") spectral region.

The method described above relative to system 500 is optionally used for continuous wave ("CW") or pulsed light sources. The method, for example, simplifies the architecture of one or more embodiments of the invention, as there is no need for a resonant cavity to be formed within the first photonic crystal fiber 15 or around the second harmonic conversion element. One or more embodiments of the invention require only a single pass through the photonic crystal fiber.

Figure 6:
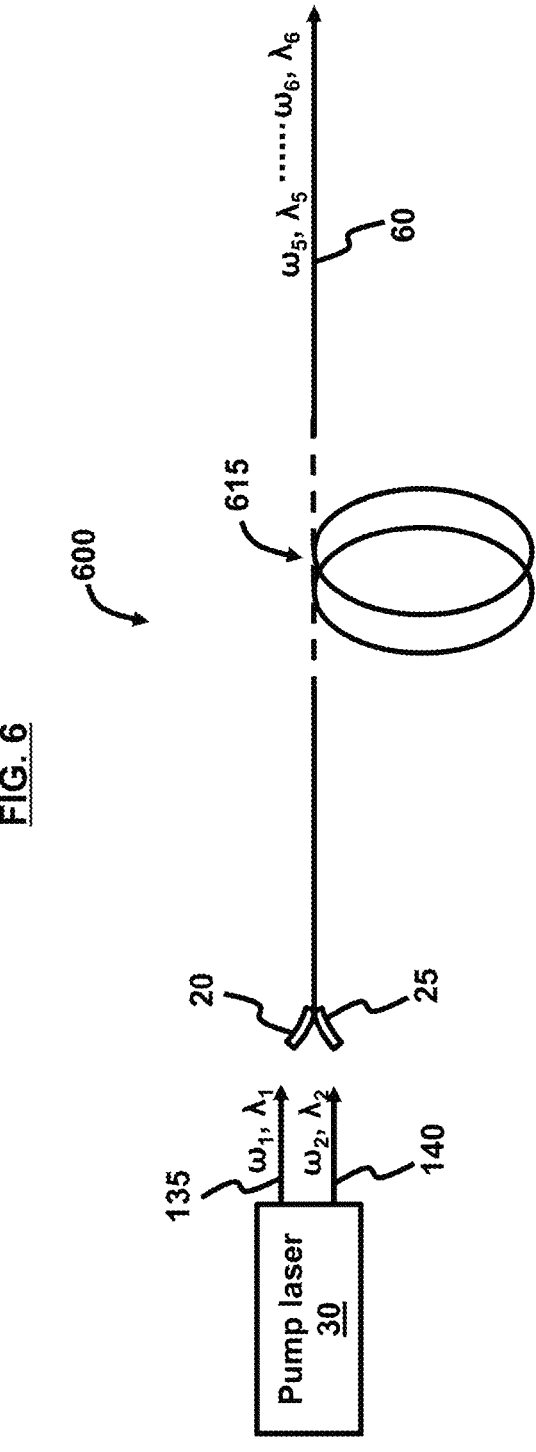
FIG. 6 is a block diagram illustrating a system of parametric amplification, according to another embodiment of the invention.

Another embodiment of the invention includes system 500 and method 600 of using same and is described as follows with reference by way of illustration to FIGS. 6 and 7. The system 600 includes a single photonic crystal fiber 615, which includes a first end, a propagation length, and a second end. The single photonic crystal fiber 615 includes a varying dispersion that varies along the propagation length. The single photonic crystal fiber 615 includes a varying mode field diameter that varies along the propagation length. The first end includes a first dispersion at a wavelength. The first dispersion is normal. The second end includes a second dispersion at the wavelength. The second dispersion is anomalous. The first end includes a first mode field diameter at the wavelength. The second end includes a second mode field diameter at the wavelength. The second mode field diameter is smaller than the first mode field diameter. For example, the single photonic crystal fiber 615 includes a mode field diameter gradient between the first mode field diameter and the second mode field diameter along a propagation length of the single photonic crystal fiber. For example, the mode field diameter gradient includes a decreasing, linear gradient. As another example, the mode field diameter gradient includes a decreasing, non-linear (i.e., curved) gradient. For example, typical reductions of the mode field diameter from the first mode field diameter to the second mode field diameter are, for example, in the range of 1.2 to 10, and more typically in the range of 1.2 to 2.5.

Optionally, the system 600 further includes a pump laser 30, in operation, emitting an electromagnetic radiation wave comprising the wavelength. The system 600 further includes a coupler 20 coupled to the pump laser 30 and to the single photonic crystal fiber 515. Optionally, the pump laser 30 comprises a Ytterbium (Yb) doped fiber laser with a linewidth<1 nm.

Optionally, the single photonic crystal fiber 615 includes a silica, solid core photonic crystal fiber. The silica, solid core photonic crystal fiber includes a core diameter between 2 $\mu$m and 25 $\mu$m.

The method 700 of using system 600 is described as follows with reference by way of illustration to FIG. 7. In Step 705, pair of pump electromagnetic radiation waves is emitted from a pump laser into a single photonic crystal fiber at a first oscillation frequency and a second oscillation frequency. The single photonic crystal fiber includes a first end, a propagation length, and a second end. The single photonic crystal fiber includes a varying dispersion that varies along the propagation length. The single photonic crystal fiber includes a varying mode field diameter that varies along the propagation length. The first end includes a first dispersion at the first oscillation frequency and second oscillation frequency. The first dispersion is normal. The second end includes a second dispersion at the first oscillation frequency and second oscillation frequency. The second dispersion is anomalous. The first end includes a first mode field diameter at the first oscillation frequency and second oscillation frequency. The second end includes a second mode field diameter at the wavelength. The second mode field diameter is smaller than the first mode field diameter. In Step 710, the pump laser is tuned to alter a broadband spectrum. In Step 715, the broadband spectrum is emitted from the second end.

In the above-mentioned embodiment of the invention, the dispersion and mode field diameter of the photonic crystal fiber 615 changes along the propagation length of the waves inside the fiber to slowly alter the dispersion at the input pump wavelengths (135 and 140) such that the dispersion at these wavelengths changes from normal to anomalous and the mode field diameter at wave 135 and 140 is reduced. Typical reductions of the mode field diameter are, for example, in the range of 1.2 to 10, and more typically in the range of 1.2 to 2.5. Typical changes in the dispersion can be characterized by the pump wavelength difference from a zero dispersion wavelength, $\lambda_0$, such as shown in FIG. 8. Because the fiber parameters are changing along the propagation length of the photonic crystal fiber, each position along the fiber includes a respective zero dispersion wavelength. If the pump wavelength is larger than the zero dispersion wavelength, then it is in the normal dispersion range. As can be seen in FIG. 8, the normal dispersion range is positive. If the pump wavelength is smaller than the zero dispersion wavelength, then it is in the anomalous dispersion range. As can be seen in FIG. 8, the anomalous dispersion range is negative. For example, the difference between the zero dispersion wavelengths of wave 135 and wave 140 to the zero dispersion wavelength ranges from typical values of 0 to 100 nm in the normal range to 0 to –400 nm (e.g., more typically –100 to –300 nm) in the anomalous range. For example, this specified difference between the zero dispersion wavelengths of wave 135 and wave 140 to the zero dispersion wavelength ranges enable four-wave mixing to be the dominant non-linear effect.

The following examples describe techniques of practicing the embodiments herein. While the examples describe specific implementations, configurations, materials, sizes, etc., the embodiments herein are not restricted to these particular parameters. Accordingly, other parameters may be used and implemented in accordance with the embodiments herein.

Example 1

A 1.064 $\mu$m laser is launched into a photonic crystal fiber with parameters nominally: pitch, $\Lambda$=5.16 $\mu$m, hole diameter, d=2.32 $\mu$m and ratio d/$\Lambda$=0.45 to phase match the signal, idler, and pump to generate a signal at wavelength 690 nm, and an idler at wavelength 2.3 $\mu$m in the short wave IR through parametric amplification. The cross-section of the silica photonic crystal fiber is shown in FIG. 2B. The pump and generated signal and idler are shown in FIG. 7. The remaining pump, generated signal and the generated idler are all launched into a second photonic crystal fiber with pitch $\Lambda$=3.11 $\mu$m, hole diameter, d=2.38 $\mu$m and ratio d/$\Lambda$=0.76. The second fiber displays a zero dispersion wavelength at 915 nm, being –149 nm from the 1.064 um wavelength. The mode field diameter is 2.76 um, approximately 1.9 times smaller than the first fiber. The propagation in the second fiber generates a broad range of colors spanning to 450 nm to 2300 nm.

Example 2

A 1.02 $\mu$m laser is launched into a photonic crystal fiber with parameters that vary continuously along the length of the fiber. The input side has nominally: pitch, $\Lambda$=5.9 $\mu$m, average hole diameter, d=2.6 $\mu$m and ratio d/$\Lambda$=0.86 to phase match the signal, idler, and pump to generate a signal at wavelength 854 nm, and an idler at wavelength 1.26 $\mu$m in the short wave IR through parametric amplification. The cross-section of the input side of silica photonic crystal fiber is shown in FIG. 2B. The fiber parameters decrease monotonically along the fiber, with the fiber output displaying a significantly different set of parameters, with pitch $\Lambda$=3.97 $\mu$m, hole diameter, d=1.75 $\mu$m and ratio d/$\Lambda$=0.86. The pump propagates in the fiber initially generating a set of signal and the generated idler, which propagate in the fiber to form a continuum of wavelengths spanning 450 nm to 2300 nm. The output of the fiber displays a zero dispersion wavelength at 911 nm, being –109 nm from the 1.02 um wavelength. The mode field diameter is 2.72 um, approximately 1.45 times smaller than the input side of the fiber.

The embodiments herein provide a system and method for achieving multi-wavelength sources over a broad wavelength region, from UV to Short Wave-IR ("SWIR"). A method involves using high nonlinearity silica photonic crystal fibers ("PCF") 15 to generate light by parametric mixing. By controlling the core size, cladding hole size, and pitch of the PCF, the dispersion of the fiber can be tailored to achieve phase matching over the pump, signal, and idler laser wavelengths to maximize the nonlinear conversion. The emitted light signal from the parametric process as well as the remaining pump and idler are coupled to a second photonic crystal fiber with specific dispersion and mode field diameter to broaden the short wavelength emitted light into a continuum of wavelengths. Applications of such sources include LIDAR, chemical and biological sensing, projection display technology, laser light show technology, illumination sources, multi-wavelength material processing, and medical applications, among others.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed is:

1. An apparatus comprising:
a first photonic crystal fiber comprising a first dispersion at a pump wavelength, the first dispersion being normal, said first photonic crystal fiber comprising a first mode field diameter at the pump wavelength, said first photonic crystal fiber comprising a zero dispersion, the pump wavelength being within 100 nm of the zero dispersion; and
a second photonic crystal fiber coupled to said first photonic crystal fiber and outputting a broadband spectrum, said second photonic crystal fiber comprising a second dispersion at the pump wavelength, the second dispersion being anomalous, the second dispersion being negative, the first dispersion being positive, said second photonic crystal fiber comprising a second mode field diameter at the pump wavelength, the second mode field diameter being smaller than the first mode field diameter.

2. The apparatus according to claim 1, further comprising:
a pump laser coupled to said first photonic crystal fiber, said pump laser, in operation, emitting the pump wavelength.

3. The apparatus according to claim 2, wherein said pump laser comprises a Ytterbium (Yb) doped fiber laser with a linewidth<1 nm.

4. The apparatus according to claim 1, wherein at least one of said first photonic crystal fiber and said second photonic crystal fiber comprises a silica, solid core photonic crystal fiber comprising a core diameter between 2 μm and 25 μm.

5. The apparatus according to claim 1, further comprising:
a signal laser coupled to said first photonic crystal fiber, said signal laser, in operation, emitting a signal wavelength,
wherein the signal wavelength is phase matched to the pump wavelength.

* * * * *